July 30, 1929.  F. KURZ  1,722,756
MEANS FOR CORRECTING TEMPERATURE ERRORS IN ELECTRIC METERS
Filed Nov. 12, 1926
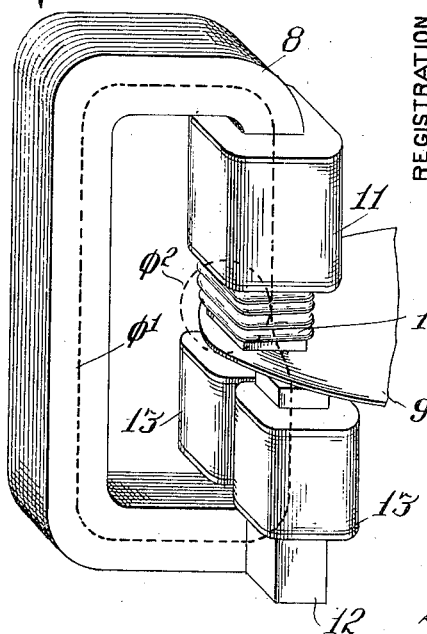
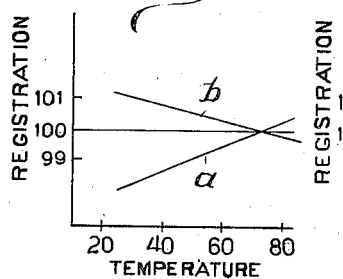
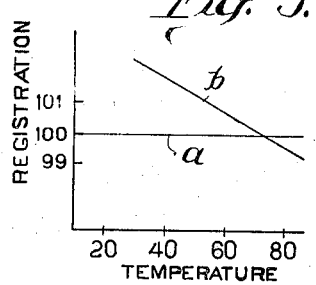
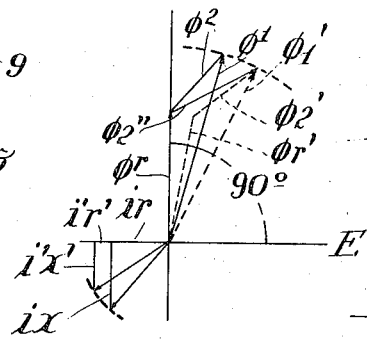
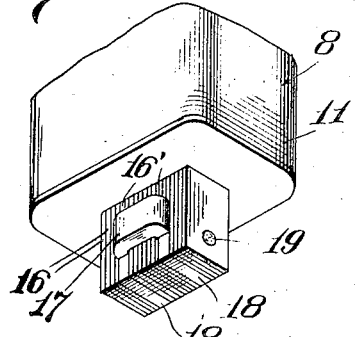
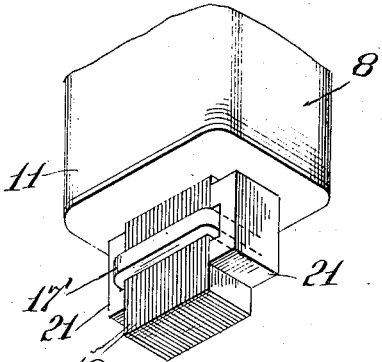
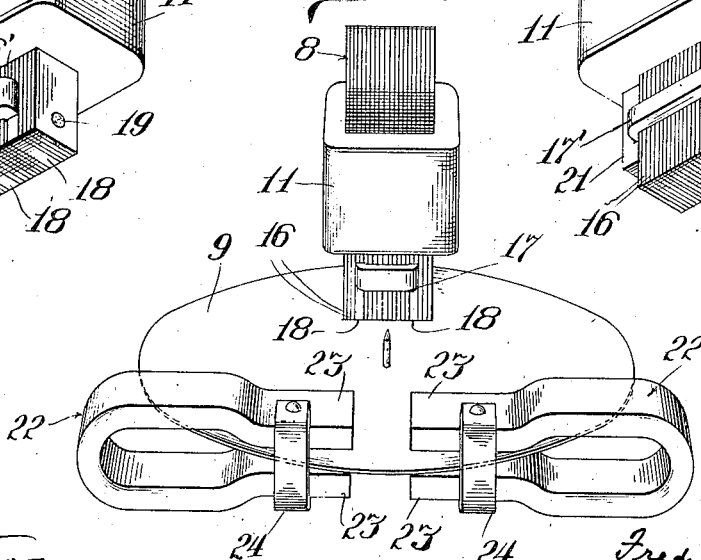
Witness
Milton Lenoir
Inventor
Fred Kurz,
By John L. Jackson.
Attorney Patented July 30, 1929.

1,722,756

UNITED STATES PATENT OFFICE.

FRED KURZ, OF SPRINGFIELD, ILLINOIS, ASSIGNOR TO SANGAMO ELECTRIC COMPANY, OF SPRINGFIELD, ILLINOIS, A CORPORATION OF ILLINOIS.

MEANS FOR CORRECTING TEMPERATURE ERRORS IN ELECTRIC METERS.

Application filed November 12, 1926. Serial No. 147,873.

The present invention pertains to the correction of temperature errors in electric meters, and has particular reference to the correction of such errors in alternating current meters of the induction type. It is often necessary to install meters in locations where they are subjected to wide variations of temperature, or to a continued abnormal temperature, and the average induction type of watthour meter will under these conditions show an appreciable error arising entirely from the influences of temperature on the meter. For example, in an outdoor installation, such as on a transformer pole or the like, the seasonal temperature variation may even exceed 100° F., and in indoor installations, such as near boilers, refrigerating apparatus etc., the meter may be subjected to considerable temperature variations, or to a sustained abnormal temperature.

In providing means for correcting or compensating for these temperature errors, one of the principal objects of the invention is to provide correcting means which will be substantially accurate at all power factors. Numerous temperature correcting methods and devices have been heretofore proposed, but all of these methods and devices with which I am familiar have only been capable of effecting a temperature correction at one power factor. For example, if adjusted for effecting temperature compensation at unity power factor, these prior devices would entirely defeat their intended purpose at a lower power factor owing to their tendency to aggravate or increase the temperature error otherwise existing at this lower power factor.

In the following detailed description I have illustrated the preferred manner of carrying out my invention, and in this description other secondary objects and advantages will appear. In the drawing accompanying this description:

Figure 1 is a fragmentary perspective view illustrating the voltage and current elements of a typical induction meter.

Fig. 2 is a graph illustrating typical temperature error curves corresponding to unity and 50% lagging power factors.

Fig. 3 is a similar view showing the registration curve where the temperature correction has been made at unity power factor, and illustrating the effect of this temperature correction on the temperature error at 50% lagging power factor.

Fig. 4 is a vector diagram illustrating the relation of current and flux existing in the potential element of an induction meter.

Fig. 5 is a fragmentary perspective view of the pole face of the potential element illustrating the present improved arrangement of the compensating coil, and the means for thermally controlling the reactance of this coil.

Fig. 6 is a similar view illustrating a modified disposition of the compensating coil, and of the thermally responsive reactance controlling means for this coil, and Fig. 7 is a perspective view of the main meter elements, illustrating secondary temperature correcting means operating in conjunction with the temperature correcting means illustrated in Figs. 5 and 6.

The changes in registration which practically all watthour meters, and particularly those of the induction type, suffer as a result of change of temperature are in general due: First, to changes in the resistance of the electrical circuits of the meter; and second, to changes in the temperature of the permanent magnets and other structural parts of the meter. When watthour meters of the induction type are operating at approximately unity power factor, the changes in registration are caused primarily by change in temperature of the permanent magnets and the structural parts of the meter; while if the meter is operating at a lower power factor the changes in registration with changes in temperature are due to both causes acting conjointly, i. e., to the changes in the resistance of the electrical circuits of the meter acting conjointly with the changes in the temperature of the permanent magnets and other structural parts of the meter. In illustration of this, attention is directed to Fig. 2 wherein $a$ represents the temperature registration curve of a typical induction, watthour meter operating at approximately full load, and unity power factor, and curve $b$ is a similar curve made under the same conditions but with the exception that the meter is operating at approximately 50% lagging power factor. It will be observed that the temperature error for unity power factor is reversed with respect to the temperature error for 50% lagging power factor, the former showing an increasing registration with increasing temperature, and the latter showing a decreasing registration with increasing temperature.

As before remarked, correcting devices have heretofore been employed for the purpose of compensating for those thermally influenced factors which cause changes in registration with changes in temperature at unity power factor. These prior devices have operated upon one or the other of the following two methods:

(1) The use of bi-metallic thermally responsive supports for the damping magnets which change the magnetic damping or retarding force by an amount sufficient to offset the tendency for a change in meter speed with a change in temperature.

(2) The use of alloys which are magnetic at ordinary temperatures and whose magnetic properties are functions of the temperature. These alloys are associated with the permanent magnets in such a way that they produce effects substantially equivalent to the bi-metallic magnet supports referred to above.

Such devices when applied to a meter of the induction type have the effect shown in Fig. 3, wherein $a$ is again the temperature registration curve for unity power factor and $b$ is likewise the temperature registration curve for a condition of 50% lagging power factor. It will be noted from this figure that while these prior devices are effective for compensating for the thermally responsive influences which change the registration at unity power factor, the temperature error for a condition of 50% lagging power factor is aggravated over the previously existing condition represented in Fig. 2, the angle between the two curves $a$ and $b$ remaining practically constant. Assuming that the thermally influenced factors which cause changes in registration at unity power factor for changes in temperature have been compensated for by one of the means outlined above, it is not difficult to understand the causes for changes in registration at low power factors.

In order that an induction meter may register correctly at low values of power factor, it is usually necessary to provide the end portion of the potential element, adjacent the pole face thereof, with a small coil or short-circuited turn of copper wire, the purpose of which is to bring the flux from the tip of the potential element into exact quadrature with the applied voltage. Figure 1, illustrating the typical assembly of the potential and current elements of an induction meter, shows such a compensating coil. The C-shaped magnet structure 8 has one leg thereof extending down into close proximity to the rotating disc 9, this leg generally having the potential winding 11 mounted thereon. The other end of this potential magnet structure abuts a U-shaped magnet structure 12, the two legs of which extend into close proximity to the opposite side of the disk 9, and support the current windings 13—13 thereon. The aforementioned compensating coil, often referred to as the lagging coil, is indicated at 14, this coil generally being mounted on the potential magnet structure between the potential winding 11 and the pole face of the magnet. As before remarked, the purpose of this coil is to bring the flux from the tip of the potential element 8 into exact quadrature with the voltage applied to the winding 11; and, in general, the magnitude of this additional compensation will depend upon the resistance of the potential element and the various losses. The compensating or lagging coil 14 has an inherent resistance, and the amount of such compensation exerted thereby is therefore affected by changes in temperature. An increase in temperature of the meter generally increases the resistance of both the potential winding 11 and the compensating or lag coil 14. An increase in the resistance of the potential coil generally calls for increased compensation from the lag coil, but under the present assumed conditions the compensation actually falls off because of the increase in resistance of the lag coil. The registration of the meter, at low power factors which are lagging therefore falls off with increasing temperature.

In carrying my invention into effect I provide means whereby the magnetic flux from the pole tip of the potential element will always be maintained substantially in quadrature relation to the applied voltage through a wide range in temperature of the meter. This will tend to bring the two curves $a$ and $b$ of Fig. 2 into coincidence, so that whatever method may be employed in compensating the changes in registration at unity power factor will also be effective in compensating the changes in registration at all power factors. The action of this temperature correcting means will be best understood by first referring to the vector diagram of Fig. 4 illustrating the relation between current, flux and resistance in the potential element of compensated and uncompensated meters. The potential winding 11 of a typical induction meter consists of a large number of turns of wire having a relatively high inductance L and a certain ohmic resistance R. The small compensating or lag coil 14 which is inductively coupled to the potential winding 11, likewise has a certain inductance $l$ and resistance $r$. When at any given temperature the meter has been compensated so as to give correct registration at all power factors of load, there is associated with the potential winding 11 a magnetic flux $\varnothing_1$, and with the log coil 14 a magnetic flux $\varnothing_1$ plus $\varnothing_2$, the vector sum of these two producing a resultant total flux $\varnothing_r$, which threads the meter disc and is in quadrature with the applied voltage E, as shown in Fig. 4. Should the temperature of the potential winding 11 change, there will be a corresponding change in its equivalent resistance R, so that the original flux $\varnothing_1$ threading the same is now changed to $\varnothing_1'$. There also results a corresponding increase in the resistance of the lag coil 14 which not only decreases the flux $\varnothing_2$ but also changes it by a small angle, as shown in $\varnothing_2'$, which, when now added to $\varnothing_1'$, does not produce a flux which is in quadrature with the applied voltage E, but produces a flux which is more nearly shown by $\varnothing_r'$.

It will be readily seen from Fig. 4 that in order to leave the total flux $\varnothing_r$ unaltered, both as regards direction and magnitude for any given change in temperature of the meter, the corrective flux $\varnothing_2''$, which is provided by the lagging coil 14 must be caused to vary both as regards direction and magnitude. Thus, under the assumed conditions represented in Fig. 4, if a given change in temperature of the meter has changed the flux in the winding 11 to $\varnothing_1'$, the corrective flux furnished by the coil 14 must be changed from $\varnothing_2$ to $\varnothing_2''$. From Fig. 4 it will be seen that if there is chosen a coil 14 in which the reactance is somewhat higher than its equivalent resistance, a decrease in the reactance by a certain predetermined amount may be sufficient to produce a flux $\varnothing_2''$ of the proper magnitude and direction to substantially maintain $\varnothing_r$ at the original value both as regards magnitude and phase. While I have outlined here the method for maintaining $\varnothing_r$ constant in magnitude, this is not essential to the proper working of my invention for obviously a change in magnitude with a change in temperature can be compensated for by one or the other of the temperature correcting methods hereinbefore outlined at (1) and (2). In the vector diagram, $r'$ is the resistance of the coil 14 after a change in temperature and $i'$ is the current in the coil after a change in temperature and a change in the reactance from $x$ to $x'$. The voltage of the coil 14 is supposed to remain practically unchanged by a change in the value of $r$ and $x$ to $r'$ and $x'$. A decrease in the reactance $x$ to $x'$ is assumed in this case to actually increase the current to $i'$. This increase in current gives an increase in the magnitude of the compensation, and the decrease in reactance, together with the increase in resistance, result in the necessary change in phase angle. The two changes taken together constitute the means whereby the corrective flux $\varnothing_2$ is changed to $\varnothing_2''$, thus leaving the meter for this condition unaltered by a change in temperature. The values of resistance and reactance to be used in any particular case will depend upon various arrangements of parts and constants of some of the electrical circuits, the details of which will vary in different instances, and which need not be described.

According to the present invention, the regulation of the flux, as outlined above, is obtained by improved means cooperating with the coil 14 whereby the reactance of the coil may be automatically and continuously varied so as to maintain over a wide range of temperature a fixed relation between the flux $\varnothing_r$ and the applied voltage. One method of attaining this end is shown in Fig. 5, which illustrates the pole extremity of the potential element 8 with the potential winding 11 thereon. It is customary to construct the magnet structure of the potential element from a plurality of laminations 16 which pass through the center of the potential winding and terminate some distance below the winding, forming a pole tip or extremity about which is usually wound a compensating coil, the terminals of which are connected to a variable resistance which serves as a means for compensating the meter. Instead of employing this form of coil I provide a link-shaped coil of wire 17 connected to a suitable resistance, or in lieu of this coil of wire a single copper band, in either instance the coil or band being fitted into two longitudinally extending openings which are formed in the pole tip by making certain of the iron laminations 16' shorter than the other laminations 16. After forcing the coil or band into position in these openings, the remaining space is completely filled by driving into place two rectangularly shaped pieces of nickel alloy 18—18, and finally securing the entire assembly together by means of a rivet pin 19. The intermediate laminations 16 which extend down through the center of the coil 17 form a central core or tongue for the coil 17 so that the coil has a substantially closed magnetic circuit consisting of the iron laminations 16 and 16' and the rectangular alloy inserts 18—18. It will be noted that this substantially closed magnetic circuit links with the magnetic circuit of the potential element 8. The magnetic properties of the two alloy inserts 18—18 are such that the permeability of the material decreases with an increase in temperature, or vice versa, over the usual range of temperature to which the meter is to be subjected. By suitable choice of the dimensions and the magnetic properties of the alloy inserts 18—18, the reactance of the coil 17 is made to vary by substantially the correct amount to maintain the conditions outlined above. The iron laminations 16 and 16' are of high permeability and are practically unaffected by temperature; hence the reactance of the coil 17 is almost entirely dependent upon the properties of the alloy inserts 18—18. I have found that certain copper nickel alloys are entirely satisfactory as materials from which to construct these temperature responsive inserts. The copper nickel alloy commonly known as Monel metal represents one such alloy.

In Fig. 6 I have illustrated a modified construction wherein the compensating coil or band 17' encircles the outer part of the magnet laminations 16. In this construction a substantially closed magnetic circuit is established for the compensating coil 17' by securing two slotted bridge members 21 to the sides of the pole extremity, with such bridge member or members arching over the compensating coil to form a return magnetic leg. It will be noted that such magnetic circuit also links with the magnetic circuit of the potential element 8. These bridge members are constructed of this same nickel alloy so that their permeability will vary as a function of the temperature, and thus the reactance of the compensating coil will vary with the temperature.

In Fig. 7 I have illustrated one of the temperature compensating methods acting on the permanent magnet system, as described at (1) and (2) in the preceding description. It is desirable to correlate this permanent magnet temperature compensation with the previously described temperature compensation in order that both registration curves will be brought back to the substantially 100% registration line. That is to say, referring to Figs. 2 and 3, the temperature compensating means associated with the potential element 8 functions to bring curves $a$ and $b$ into substantial coincidence and the secondary temperature compensating means associated with the permanent magnet system functions to bring both curves, which are now in coincidence, into substantial registry with the 100% registration line. The two permanent magnets 22 have their pole extremities 23 disposed above and below the disc 9 so that the flux passing through the disc between these pole ends will exert a damping retardation on the rotation of the disc, all of which is well known to those skilled in the art. Associated with these permanent magnets are bridging members 24 which extend from one pole portion to the other of each magnet, such bridging members being constituted of an alloy having a magnetic permeability which varies as a function of the temperature. As described of the inserts 18 and bridge members 21, this alloy is characterized by a permeability which decreases with an increase in temperature. Hence, at low temperatures a considerable part of the damping flux of these permanent magnets will be diverted through the bridging members, and at high temperatures a lesser amount of such flux will be diverted through the bridge members, with the result that a greater damping will be exerted on the disc at the higher temperatures to hold the registration curve of the meter at the 100% line. As hereinbefore remarked, however, the temperature correction thus obtained through the thermal control of the permanent magnet damping system is only effective at one power factor and to correct the meter for temperature errors at all power factors it is necessary to employ the thermally controlled compensating coil in conjunction therewith.

What I claim as my invention and desire to secure by Letters Patent, is—

1. An electric meter of the induction type comprising a rotor, a magnetizable member having a potential winding thereon, compensating means cooperating with said potential winding, and stationary means mounted on said magnetizable member for varying the reactance of said compensating means in accordance with temperature changes.

2. An electric meter of the induction type comprising a rotor, a magnetizable member having a potential winding thereon, a compensating coil cooperating with said potential winding, said compensating coil having a flux path linking with the flux path of said magnetizable member and including stationary means for varying the permeability of said flux path of the compensating coil with changes in temperature.

3. An electric meter of the induction type comprising a rotor, a magnetizable member having a pole portion disposed in proximity to said rotor, a winding on said magnetizable member, a compensating coil on said pole portion, and stationary means mounted on said magnetizable member for varying the reactance of said coil in accordance with temperature changes.

4. An electric meter of the induction type comprising a rotor, a magnetizable member having a winding thereon, electro-magnetic compensating means cooperating with said winding, said compensating means having a substantially closed magnetic circuit, and including means for varying the permeability of said magnetic circuit in accordance with temperature changes.

5. An electric meter comprising a rotor, a magnetizable member having a winding thereon cooperating with said rotor, electro-magnetic compensating means cooperating with said winding, said compensating means having a substantially closed magnetic circuit linking with the magnetic circuit of said magnetizable member, and including means for varying the reactance of said compensating means in accordance with temperature changes.

6. An electric meter of the induction type comprising a rotor, a voltage element for impressing a rotative flux on said rotor, means for maintaining said flux in quadrature with respect to the voltage impressed on said voltage element, including stationary thermally responsive means mounted on said voltage element for decreasing the reactance of said means with increase of temperature.

7. An electric meter of the induction type comprising a rotor, a voltage element for impressing a rotative flux on said rotor, means for maintaining said flux in quadrature to the voltage impressed on said voltage element, including stationary thermally responsive means mounted on said voltage element and operative to decrease the permeability of the magnetic circuit of said means with increase in temperature.

8. An electric meter comprising a rotor, a relatively stationary winding for impressing a rotative flux on said rotor, electromagnetic compensating means cooperating with said winding, including means establishing a substantially closed magnetic circuit for said compensating means, the permeability of which varies as a function of the temperature.

9. An electric meter of the induction type comprising a rotor, a magnetizable member having a pole portion disposed in proximity to said rotor, a voltage winding on said magnetizable member, a lag coil on said pole portion for maintaining the voltage flux effective on said rotor in quadrature with the voltage impressed on said winding, and means cooperating with said pole portion for establishing a substantially closed magnetic circuit for said lag coil and including means to decrease the reactance of said coil with an increase in temperature.

10. An electric meter of the induction type comprising a rotor, a magnetizable member having a pole portion disposed in proximity to said rotor, a voltage winding on said magnetizable member, a lag coil on said pole portion, and means cooperating with said pole portion for establishing a substantially closed magnetic circuit for said lag coil, said means being composed of a material the permeability of which decreases with an increase in temperature.

11. An electric meter of the induction type comprising a rotor, a magnetizable member having a pole portion disposed in proximity to said rotor, a voltage winding on said magnetizable member, a compensating coil engaging in openings in said pole portion, and metallic inserts in said openings composed of an alloy having a permeability which decreases with an increase in temperature.

12. An electric meter of the induction type comprising a rotor, a magnetizable member having a pole portion disposed in proximity to said rotor, a voltage winding on said magnetizable member, a compensating coil on said pole portion, and a bridge member engaging over said coil and contacting at its ends with said pole portion to form a substantially closed magnetic circuit for said coil, said bridge member being composed of a material the permeability of which varies as a function of the temperature.

13. An electric meter of the induction type comprising a rotor, a magnetizable member having a pole portion disposed in proximity to said rotor, a voltage winding on said magnetizable member, a compensating coil on said pole portion, thermally responsive means for varying the reactance of said compensating coil in accordance with changes in temperature, magnet means for damping the rotation of said rotor, and thermally responsive means for controlling the damping of said magnet means.

14. An electric meter of the induction type comprising a rotor, a magnetizable member having a voltage winding thereon, compensating means cooperating with said voltage winding, stationary means for varying the reactance of said compensating means in accordance with temperature changes, magnet means for damping the rotation of said rotor, and thermally responsive means for controlling the damping of said magnet means.

15. An electric meter of the induction type comprising a rotor, a magnetizable member having a winding thereon, electromagnetic compensating means cooperating with said winding, said compensating means having a substantially closed magnetic circuit and including means for varying the permeability of said magnetic circuit in accordance with temperature changes, magnet means for damping the rotation of said rotor, and thermally responsive means for controlling the density of the damping flux effective on said rotor.

16. An electric meter of the induction type comprising a rotor, a magnetizable member having a voltage winding thereon, compensating means cooperating with said voltage winding, and a bridge member cooperating with said compensating means to form a substantially closed magnetic circuit therefor, said bridge member comprising a material the permeability of which varies as a function of the temperature.

17. An electric meter of the induction type comprising a rotor, a magnetizable member having a potential winding thereon, compensating means cooperating with said potential winding to maintain the flux generated thereby in quadrature with the voltage applied thereto, said compensating means having a substantially closed magnetic circuit linking with said magnetizable member and including means for varying the reactance of said compensating means in accordance with temperature changes independently of the reaction of said winding.

18. An electric meter of the induction type comprising a rotor, a magnetizable member having a pole portion disposed in proximity to said rotor, a voltage winding on said magnetizable member, a compensating coil engaging in an opening in said pole portion, and a metallic insert in said opening composed of an alloy having a permeability which decreases with an increase in temperature.

19. An electric meter of the induction type comprising a rotor, a potential core terminating in a pole face in proximity to said rotor, said pole face having a slot cut therein, a compensating coil disposed in said slot, and an insert closing said slot below said compensating coil and completing a substantially closed magnetic circuit for said coil linking with the magnetic circuit of said potential core, said insert comprising a material the permeability of which decreases with an increase in temperature.

20. An electric meter of the induction type comprising a rotor, a voltage winding, a magnetizable member associated therewith and forming part of a potential magnetic circuit for said winding, a compensating coil mounted in fixed relation to said voltage winding, and means defining a closed magnetic circuit for said compensating coil linking with said potential magnetic circuit and comprising a material the permeability of which decreases with increase in temperature, said closed magnetic circuit being arranged with respect to said potential magnetic circuit whereby with increase in temperature the reactance of said compensating coil is decreased substantially independently of a change of reactance of said voltage winding.

21. An electric meter of the induction type comprising a rotor, a voltage winding, a magnetizable member associated therewith and forming part of a potential magnetic circuit for said winding, a compensating coil mounted in fixed relation to said voltage winding, means defining a closed magnetic circuit for said compensating coil linking with said potential magnetic circuit and comprising a material the permeability of which decreases with increase in temperature, said closed magnetic circuit being arranged with respect to said potential magnetic circuit whereby with increase in temperature the reactance of said compensating coil is decreased substantially independently of a change of reactance of said voltage winding, magnet means for damping the rotation of said rotor, and thermally responsive means for controlling the damping of said magnet means.

FRED KURZ.